July 14, 1959 — E. P. PALMATIER — 2,894,382

EVAPORATOR CONTROL FOR ABSORPTION REFRIGERATION SYSTEMS

Filed July 16, 1953 — 3 Sheets-Sheet 1

INVENTOR.
Everett P. Palmatier
BY Herman Seid
Atty.

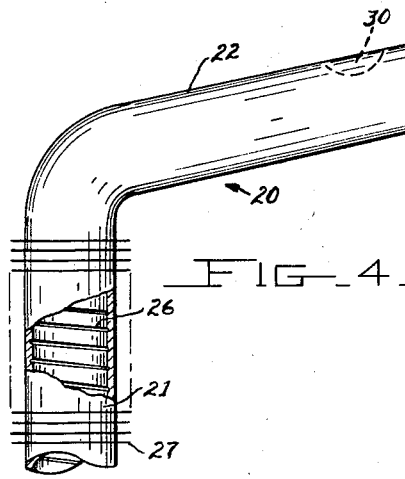
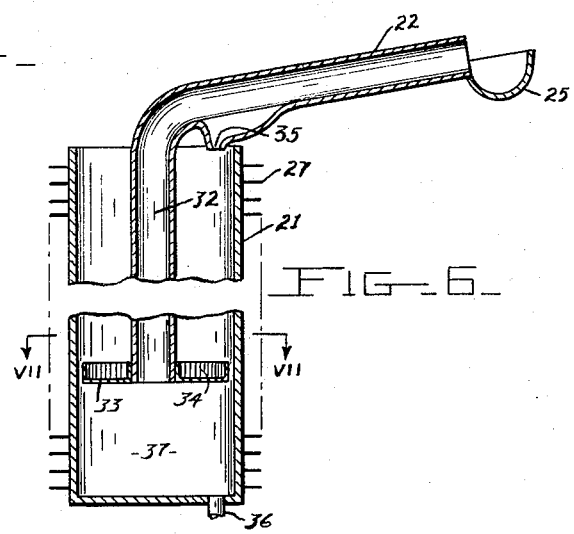
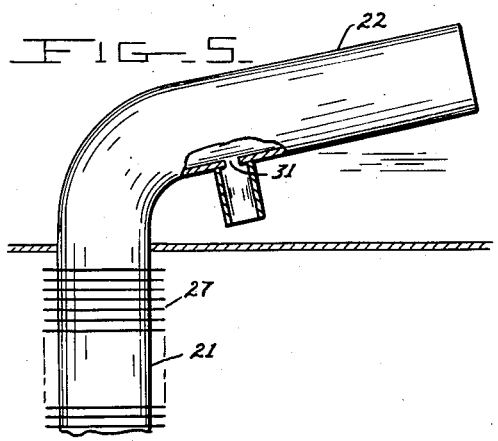
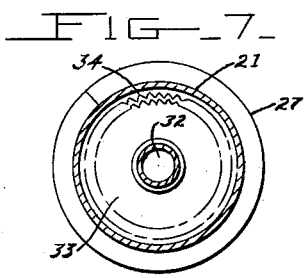

July 14, 1959 E. P. PALMATIER 2,894,382
EVAPORATOR CONTROL FOR ABSORPTION REFRIGERATION SYSTEMS
Filed July 16, 1953 3 Sheets-Sheet 3
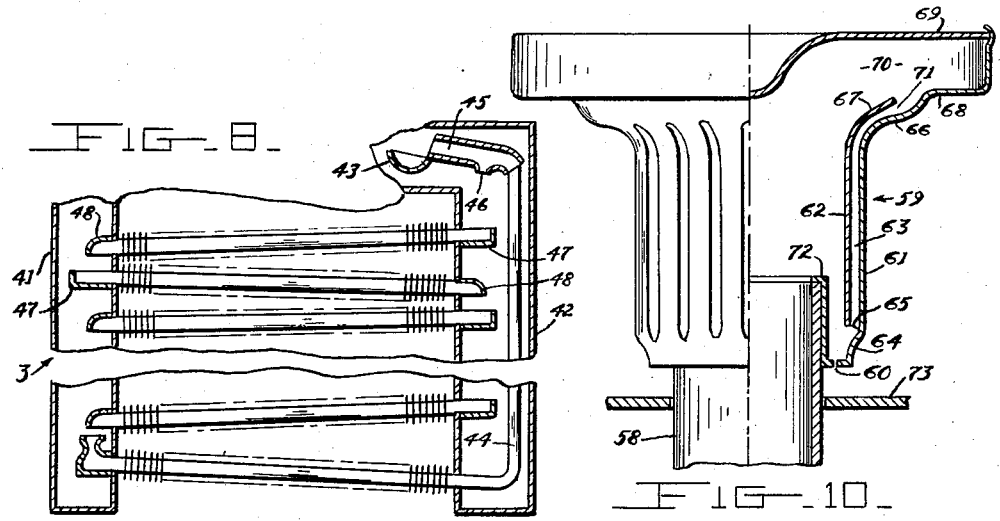
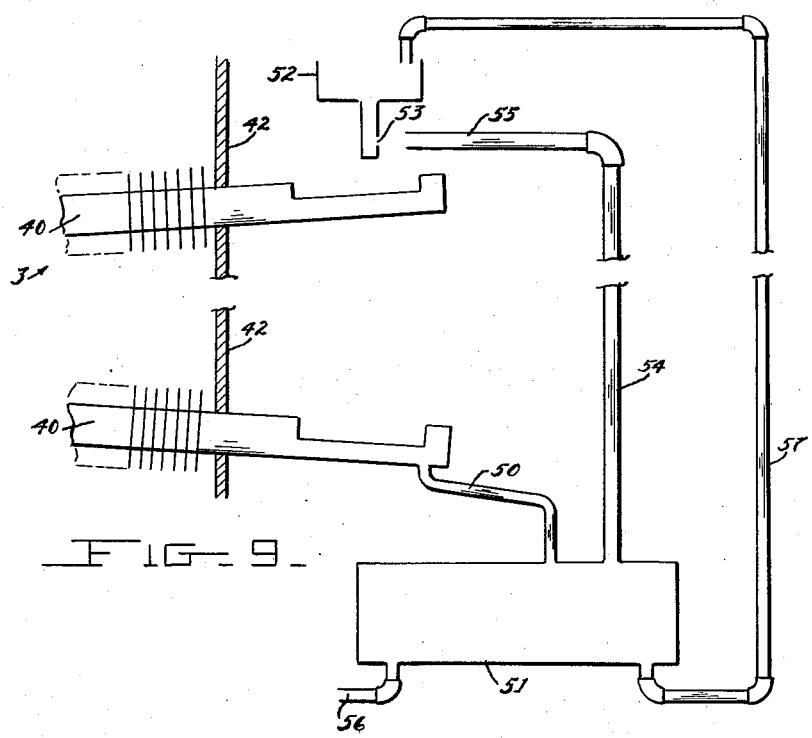
INVENTOR.
Everett P. Palmatier
BY
Herman Seid
Atty.

United States Patent Office

2,894,382
Patented July 14, 1959

2,894,382

EVAPORATOR CONTROL FOR ABSORPTION REFRIGERATION SYSTEMS

Everett P. Palmatier, Solvay, N.Y., assignor to Carrier Corporation, Syracuse, N.Y., a corporation of Delaware Application July 16, 1953, Serial No. 368,355

9 Claims. (Cl. 62—527)

This invention relates to absorption refrigeration systems and, more particularly, to absorption refrigeration systems in which the evaporator includes mechanism for regulating the supply of liquid refrigerant, such as water, thereto.

In a 5 ton absorption refrigeration system using water as the refrigerant, the quantity of liquid refrigerant circulated through the system is small, about a pint per minute. Since the quantity of circulated refrigerant is small, it will be appreciated it is extremely difficult to assure that each tube of the evaporator always receives the design quantity of refrigerant which is necessary to assure satisfactory operation of the refrigeration system. In some cases, some tubes of the evaporator may be starved, receiving little or no refrigerant, while other tubes receive excess refrigerant so that an ineffective and inefficient heat exchange relation exists with the medium to be cooled.

The chief object of the present invention is to provide a heat exchanger such as an evaporator so designed that the quantity of refrigerant supplied to each tube thereof is automatically regulated.

Another object of the invention is to provide a control that will supply refrigerant to an evaporator of a refrigeration system in response to the refrigeration load.

A further object of the invetnion is to provide a control for liquid refrigerant supply to vertical tubes of an evaporator that prevents the decrease of the supply until the entire surface of the tubes has been wetted.

Still another object of the invention is to provide a refrigerant flow control for vertical evaporator tubes. Other objects of my invention will be readily perceived from the following description.

This invention relates to an evaporator including at least one tube, means to supply liquid refrigerant to the tube, said tube being adapted to permit flow of liquid therethrough, means to remove the vapor from the tube at a plurality of points, and means employing at least a portion of the vapor of the liquid refrigerant to regulate the supply of liquid refrigerant to the tube in response to refrigeration load.

This invention also relates to a method of controlling the supply of liquid refrigerant to an evaporator tube consisting of supplying liquid refrigerant to pass through the evaporator tube, passing a medium over the tube in heat exchange relation to evaporate the liquid refrigerant in the tube, removing the vapor from the tube at a plurality of points, and regulating the quantity of liquid refrigerant supplied to the tube in response to at least a portion of the liquid refrigerant evaporated in the tube.

The attached drawings illustrate a preferred embodiment of my invention, in which Figure 1 is a diagrammatic view of an absorption refrigeration system including the evaporator of my invention;

Figure 4 is a view in elevation of a modified tube structure;

Figure 5 is a view in elevation of another modification of the structure shown in Figure 2;

Figure 6 is an enlarged fragmentary sectional view of still another modification of the structure shown in Figure 2;

Figure 7 is a sectional view taken along line VII—VII of Figure 6;

Figure 8 is a sectional view of a modified form of an evaporator;

Figure 9 is a diagrammatic view of another embodiment of my evaporator; and

Figure 10 is a view partly in section and partly in elevation of modified control mechanism.

Figure 1:
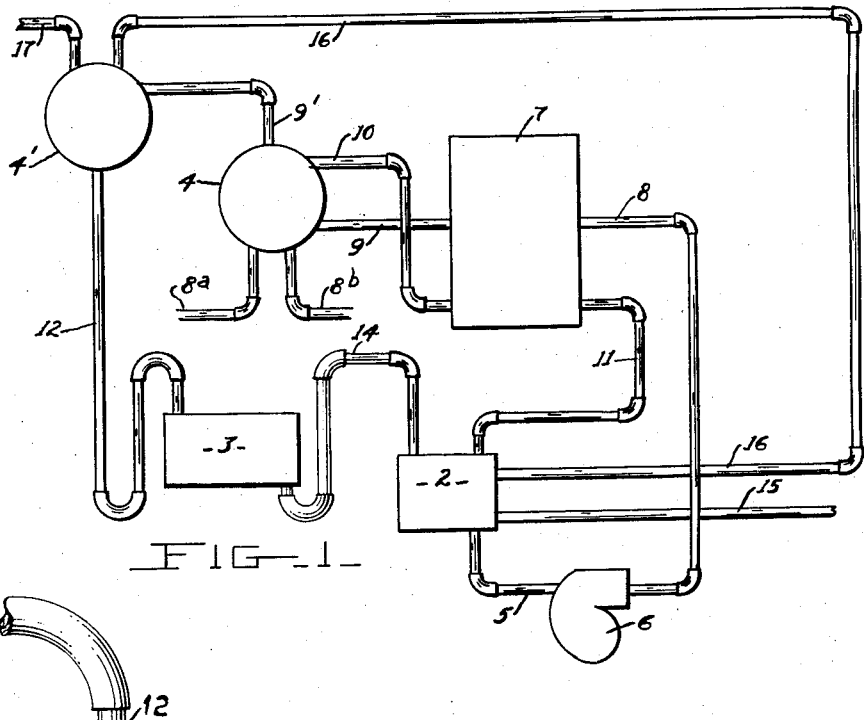

Referring to the drawings, and particularly to Figure 1, there is shown an absorption refrigeration system including an absorber 2, an evaporator 3, a generator 4, and a condenser 4' of the system. Weak solution passes from the absorber by means of line 5 to a pump 6 which sends the solution through line 8 to a heat exchanger 7 in which the weak solution is placed in heat exchange relation with strong solution. From the heat exchanger 7 the weak solution passes to the generator 4 by means of line 9.

A heating medium, such as steam, is supplied to the generator 4 by means of line 8a. The condensate leaves the generator 4 by line 8b. In the generator 4 some of the water is vaporized, the vapor passing to the condenser 4' through line 9'. The strong solution, formed by boiling off refrigerant, leaves the generator 4 by means of line 10. This strong solution then passes through the heat exchanger 7 where it warms the weak solution prior to the weak solution's entrance to the generator 4. The strong solution then passes by means of line 11 to the absorber 2.

Meanwhile, the vapor, which was generated from the weak solution by the generator has been condensed in the condenser and leaves the condenser 4' to pass to the evaporator 3 by means of line 12. This line 12 is looped to provide a pressure seal between the condenser and the evaporator thereby permitting a desired pressure differential to be maintained between the condenser 4' and the evaporator. It will be understood that the line 12, which is connected to the drain of the condenser, may be replaced by a straight line in which a restrictor is disposed to provide the desired difference in pressure. In the evaporator, the details of which will be described hereinafter, the water absorbs heat from air passing thereover and is changed to a vapor. This vapor escapes to the absorber 2 through line 14. In the absorber, the vapor is absorbed into the strong solution and the cycle is repeated.

The term "weak solution" is used herein to define a solution containing a large amount of refrigerant so that the solution is weak in absorbing properties. The term "strong solution" defines a solution which is relatively deficient in refrigerant and consequently a solution which possesses enhanced properties of refrigerant absorption.

Cooling water is supplied to the absorber 2 by means of line 15. This water then passes to the condenser 4' by means of line 16. This water is supplied to the condenser 4' to be used to condense the vapor generated by the generator. The water leaves by line 17 and is carried to a cooling tower or other suitable means, or it may be discharged to waste.

Figure 2:
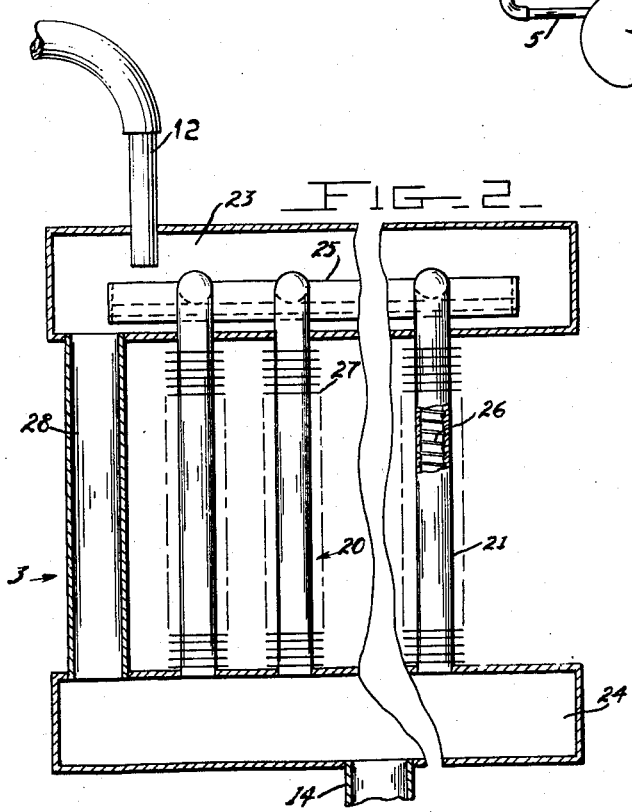
Figure 2 is a fragmentary sectional view of the evaporator of my invention.

Referring to Figure 2, there is disclosed the evaporator 3 which includes a plurality of finned evaporator tubes 20. As more clearly shown in Figure 3, each tube has a vertical portion 21 and an angular portion 22 extending upwardly therefrom. The angular portion 22 is disposed in the upper vapor header 23 while the vertical portion terminates in the lower vapor header 24. A feed trough 25 is disposed in the upper vapor header 23 and is in communication with the angular portion 22 of each evaporator tube 20. The liquid refrigerant, which is water, is supplied to the feed trough 25 in the evaporator 3 from the condenser by the line 12. To assure that the entire inner surface of each of the vertical portions of the evaporator tubes is wetted, there are provided circumferential grooves 26 in the inner surface of each tube.

Considering the operation of the device, the liquid refrigerant in the feed trough flows through the angular portion 22 to the vertical portion 21 of each tube. The liquid refrigerant in the tubes is evaporated by air passing over the tubes, which have fins 27 thereon to facilitate heat transfer between the air and the refrigerant. A portion of the vapor from the evaporated refrigerant escapes into the lower vapor header while the remainder of the vapor escapes upwardly through the angular portion into the upper vapor header. This vapor then flows to the lower vapor header by means of the bypass vapor tube 28. The vapor then passes to the absorber by means of line 14.

The amount of vapor flowing upwardly through the angular portion 22 will determine the amount of liquid refrigerant that is supplied to that particular tube. Thus, if one tube is receiving too much liquid refrigerant, a condition that will occur when the flow of liquid refrigerant might vary for any reason, the quantity of vapor passing upwardly would increase and this will reduce the flow of liquid refrigerant to this particular tube. In other words the original design involves a flow of liquid in the form of a film to a predetermined point along the inner surface with air flowing completely over the tube. The complete length of the tube is not normally wetted. Additional liquid extends the lower limit of the wetted surface but because of the increased amount of heat exchange, additional vapor will form and flow upward to retard supply of liquid thus causing the original balanced condition to be restored. It will be understood, of course, that the greater the angle of the angular portion 22, the more vapor will be required to reduce or stop the flow of liquid refrigerant to that tube.

Figure 3:
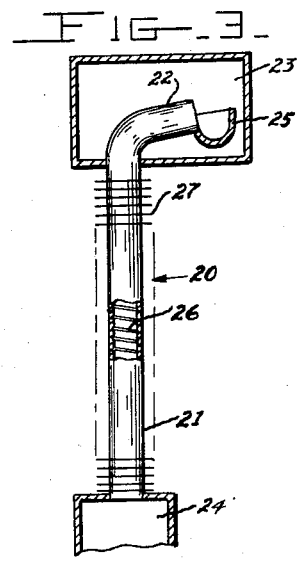
Figure 3 is a view in elevation of the evaporator of Figure 2.

The modification of Figure 4 is similar in all respects to the device of Figure 3 except that a restrictor 30 is disposed in the angular portion 22 adjacent the mouth of this angular portion. This restrictor is variable at option of designer or may be adjustable so that the area of the angular portion adjacent the mouth may be varied. Therefore, the less the area, which is determined by the amount the restrictor protrudes into the angular portion, the less quantity of vapor required to reduce or stop the feed of liquid refrigerant to that particular tube. This embodiment would normally be employed where a multiplicity of rows of tubes are placed in the direction of air flow. In this type of system, the back rows are required to produce less refrigeration than the tubes initially in contact with the air.

In Figure 5 there is disclosed another type of feed means for the evaporator tube. A slot or hole 31 is provided in the angular portion 22 of the tube adjacent its juncture with the vertical portion 21. This particular modification permits the liquid to be introduced at a lower level than the level of the mouth of the angular portion 22. The amount of liquid refrigerant fed to the vertical portion in this modification is regulated by the vapor in the same manner as Figures 3 and 4. It is believed that this method of feeding the liquid will not require the evaporator coil to be levelled as accurately as the evaporators of Figures 3 and 4.

The device of Figures 6 and 7 is similar to Figure 3 in that each finned evaporator tube has an angular portion 22 and a vertical portion 21. Disposed within the vertical portion 21 is a center tube 32 which is in communication with the angular portion and extends downwardly for most of the length of the vertical portion. At the base of the center tube 32, there is disposed an annular cup or disk 33. This cup is adapted to close the space between the center tube and the vertical portion except for a plurality of minute openings that are formed between the cup and the vertical portion 21 due to the cup being crimped along its edge as shown at 34. The angular portion is in communication with the vertical portion only by means of a small opening 35 at the juncture of the angular and vertical portions. The bottom of the vertical portion 21 has only a small hole 36 which is in communication with line 14.

Considering the operation of the feed control device of Figures 6 and 7, the liquid refrigerant is supplied from the feed trough 25 to the space between the vertical portion 21 and center tube 32 by means of the small opening 35. The refrigerant evaporated in the vertical portion above the cup 33 passes through the upper vapor header 23 and the bypass vapor tube 28 to the lower vapor header 24 from which it flows to the line 14. Any liquid refrigerant that is not evaporated when it reaches the cup 33 is caught in the cup. When the level of liquid refrigerant in the cup becomes greater than the height of the edge of the cup, the refrigerant will overflow and pass by means of the openings between the crimped edge 34 and the vertical portion 21 into the lower part of the vertical portion 21. This lower part forms a reservoir 37 and the vapor generated from this reservoir will rise up the central tube 32 to the angular portion 22. It is obvious that the amount of vapor ascending in the central tube 32 will govern the amount of liquid refrigerant that is being supplied to the vertical portion 21 by means of the opening 35.

In Figure 8, the evaporator 3 is disclosed as including a plurality of finned tubes 40 which are at a slight angle to the horizontal and to each other. These tubes 40 are disposed between vertical vapor headers 41 and 42. All of the tubes except the lowermost one are in communication with both vapor headers 41 and 42. Liquid refrigerant is supplied to the feed trough 43 in the evaporator 3 from the condenser by means of the line 12. The lowermost tube of the evaporator tubes communicates with a vertical line or tube 44 at one end. This tube 44 extends upwardly through the vapor header 42 and terminates in an angular portion 45 which is in communication with the feed trough 43. This portion 45 has a hole or slot 46 therein for a purpose to be described hereinafter.

Considering the operation of the evaporator and its feed control of Figure 8, liquid refrigerant from the feed trough 43 flows into the angular portion 45 of vertical tube 44. The slot or hole 46 is provided in the underside of the angular portion 45 to permit the liquid refrigerant to drip from the angular portion to the uppermost tube of the evaporator tubes 40. This uppermost tube has a flanged pan 47 extending therefrom into the vapor header 42 to catch the refrigerant from hole 46. At its other end, this uppermost tube has an angular lip 48 extending from the top part of tube into the vapor header 41. This lip will cause the liquid refrigerant to be directed on to the flange pan 47 of the next tube while any vapor formed in this uppermost tube will escape by means of the vapor header 41. This permits the flow throughout the evaporator tubes to be continuous and in series. The lowermost tube receives any liquid refrigerant remaining in the system and this refrigerant, when it is evaporated, passes upwardly through line 44. The flow through line 44 will permit the vapor to regulate the quantity of refrigerant being supplied to the evaporator from the feed trough 43. Therefore, if all of the refrigerant in the evaporator is vaporized before it reaches the bottom tube, the liquid refrigerant will flow at its maximum from the feed trough 43 into the evaporator. However, if a large quantity of refrigerant is unevaporated when it reaches the lowermost tube, it will be evaporated and flow as a vapor through the line 44 and portion 45 to regulate the quantity of refrigerant flowing from feed trough 43.

Referring to the embodiment of Figure 9, there is disclosed an evaporator 3 similar to the evaporator of Figure 8 in that the evaporator tubes 40 are at a slight angle to the horizontal and to each other. The lowermost tube of this evaporator is connected by means of line 50 to a heater 51. The refrigerant is supplied to the evaporator by means of a feed trough reservoir 52, which has a feed opening or hole 53 in its lowermost portion as clearly shown in Figure 9. Extending upwardly from the heater 51 is a line 54 which terminates in a horizontal portion 55 adjacent the feed hole 53 of feed trough 52.

Any liquid refrigerant that is not evaporated in the evaporator flows therefrom by means of line 50 to the heater 51 where it is vaporized. This vapor passes upwardly through line 54 and issues from the horizontal portion 55 as a jet of vapor to regulate the amount of liquid refrigerant flowing from the feed hole 53. Thus, if all of the refrigerant is evaporated in the evaporator before it reaches the line 50, then no vapor will flow up line 54 and the liquid refrigerant will be supplied to the evaporator at a maximum. If the refrigeration load is low, then a large quantity of refrigerant will remain unevaporated when it enters line 50. The heater 51 will evaporate this refrigerant and cause it to pass upwardly through line 54. When this vapor issues from the horizontal portion 55, it will impinge against the feed hole 53 and reduce or entirely stop the supply of liquid refrigerant therefrom depending on the quantity of liquid refrigerant entering the heater.

While any desired means may be employed to furnish the source of heat in heater 51, it is preferable to use the liquid refrigerant from the condenser as the heat source. The liquid refrigerant flows from line 12 through the heater 51 by means of line 56. It will be understood that line 56 communicates with line 12 above the lowermost part of the U-shaped line 12. Upon leaving the heater, the liquid refrigerant flows to the feed trough or reservoir 52 by means of line 57.

Another feed control means for regulating the supply of liquid refrigerant to a vertical tube of the evaporator is disclosed in Figure 10. Disposed about an evaporator tube 58 is a feed control device 59, which has one or more feed holes or openings 60 spaced about the bottom thereof. The device 59 includes two substantially cylindrical portions 61 and 62 spaced from each other by protuberances preferably on the inner side of cylinder 61. This provides a multiplicity of passageways 63 between portions 61 and 62. It will be noted that the cylinder 62 is spaced at its lower end from the angular extension 64, which extends from the lower portion of cylinder 61, to form an opening 65 between extension 64 and cylinder 62.

The upper ends of cylinders 61 and 62 terminate in angular portions 66 and 67. A horizontal portion 68 extends from the angular portion 66. A top 69 is mounted above the horizontal portion 68 to provide a passage 70 therebetween. An opening 71 is formed between the spaced angular portions 66 and 67. The feed control device 59 is supported from the tube 58 by means of flanged member 72. The bottom of the reservoir of the refrigerant is indicated by member 73.

Liquid refrigerant enters through the feed hole 60 and fills up the portion of the device 59 surrounding the tube 58 until the level in the device 59 reaches the top of the tube 58 when liquid refrigerant begins to flow over the lip of the tube and wet the inner surface of the tube. The vapor generated from the liquid refrigerant being evaporated in tube 58 will flow upwardly through cylinder 62 to passage 70. The area of the passage 70 in the vicinity of opening 71 is smaller in cross section than the area of the tube 58 so that the velocity of the vapor in passage 70 is greater than in cylinder 62 and the static pressure in passage 70 is less than at the exit of tube 58. Therefore, this vapor will tend to cause the liquid to rise in passages 63 and be entrained with the vapor in passage 70 by escaping through the opening 71 formed between the portions 66 and 67 continuing on through an opening (not shown) to the vapor header. By selecting the area of passage 70 and the distance between the top of the tube 58 and the horizontal portion 68, the desired amount of flow of liquid refrigerant to the tube may be regulated.

This invention has the advantage of providing each tube in an evaporator with the amount of refrigerant required in response to the refrigeration load.

While I have described a preferred embodiment of my invention, it will be understood that my invention is not limited thereto since it may be otherwise embodied within the scope of the following claims.

I claim:

1. A feed control for an evaporator tube, said tube having a vertical evaporating portion and an angular portion extending upwardly therefrom, means disposed adjacent the juncture of the angular and vertical portions of the tube to supply liquid refrigerant thereto, and means regulating the supply of liquid refrigerant in response to the quantity of refrigerant in the vertical portion of the tube.

2. A feed control for an evaporator tube, said tube having a vertical evaporating portion and an angular portion extending upwardly therefrom, a central tube disposed inside the vertical portion and extending through the upper part of the vertical portion for passage of vapor from the lower part of the vertical portion to the angular portion, said angular portion being in communication with both the vertical portion and the central tube, said communication between the vertical and angular portions being a slight opening between the central tube and the vertical portion at the juncture of the vertical and angular portions, means to supply liquid refrigerant to the vertical portion, a cup disposed between the bottom of the central tube and the wall of the vertical portion, said cup being crimped to permit communication from the vertical portion above the cup to the vertical portion below the cup, said vertical portion below said cup forming a reservoir for liquid refrigerant whose vapor passes through the central tube to the angular portion to regulate the supply.

3. A feed control for an evaporator tube, said tube having a vertical evaporating portion and an angular portion extending upwardly therefrom, means to supply liquid refrigerant to the angular portion of the tube from which it flows by gravity to the vertical portion, means to regulate the supply of liquid refrigerant to the tube in response to the refrigeration load, and adjustable means to vary the supply of liquid refrigerant when the upward vapor flow is constant.

4. An evaporator for receiving liquid refrigerant for vaporization therein, comprising an evaporating tube having an inner surface for accommodating liquid refrigerant in film form, said tube further having a substantially vertical first portion and a second portion inclined with respect to said first portion, said inclined portion being arranged with respect to said first portion so that at least a part of the vaporous refrigerant formed in the element flows in opposition to a predetermined flow of liquid refrigerant to the element and that increased vapor flow created by a supply of liquid refrigerant in excess thereof serves to reduce said flow to the predetermined value, and means for supplying liquid refrigerant to said inclined portion.

5. An evaporator for receiving refrigerant in the liquid phase for vaporization therein comprising an upper header, a lower header, at least one element having a first portion in communication with the lower header and a second portion inclined with respect to the first portion, for receiving liquid refrigerant for flow into said element, the inclination of said second portion being such that a part of the vaporous refrigerant formed in the element flows upwardly through the second portion to create a force opposing flow to the element of liquid refrigerant whereby excessive vapor flow, created when a supply of liquid refrigerant in excess of a predetermined amount is presented to the element, causes additional force to oppose the excessive liquid flow and reduce the liquid flow to the predetermined amount.

6. An evaporator comprising an upper header, a lower header, at least one substantially vertical tube having a first end portion in communication with the upper header and a second end portion in communication with said lower header so that vaporous refrigerant formed in the tube is free to flow from either end in substantially equal parts, means for supplying liquid refrigerant to the upper end of the tube, the upper end portion of the tube being inclined to the extent that liquid refrigerant in excess of an amount sufficient to flow by gravity to a predetermined point on the inner surface of the tube is opposed by the increased vaporous refrigerant flow due to additional liquid supply.

7. The invention set forth in claim 4 wherein said last mentioned means includes an opening in said inclined portion placed at least a sufficient distance from the vertical portion to permit flow to be controlled through the inclined portion.

8. The invention set forth in claim 4 wherein liquid refrigerant is supplied to one end of the inclined portion of the evaporator tube, said inclined portion being provided with a surface depression for restricting flow of vapor formed in the tube toward the end of the tube through which liquid refrigerant is introduced.

9. In an absorption refrigeration system including in combination an absorber, an evaporator, a generator and a condenser in a closed circuit, a line leading from the absorber to the generator to carry weak solution, a pump in said line, a second line leading from the generator to the absorber to carry strong solution, a third line leading from the condenser to the evaporator to carry liquid refrigerant, a fourth line leading from the evaporator to the absorber to carry vaporized refrigerant, means to pass cooling water through the absorber and the condenser, said evaporator comprising an evaporating tube having an inner surface for accommodating liquid refrigerant in film form, said tube further having a substantially vertical first portion and a second portion inclined with respect to said first portion, said inclined portion being arranged with respect to said first portion so that at least a part of the vaporous refrigerant formed in the element flows in opposition to a predetermined flow of liquid refrigerant to the element and that increased vapor flow created by a supply of liquid refrigerant in excess thereof serves to reduce said flow to the predetermined value, and means for supplying liquid refrigerant to said inclined portion.

References Cited in the file of this patent

UNITED STATES PATENTS

| | | |
|---|---|---|
| 893,204 | Starr et al. | July 14, 1908 |
| 2,368,455 | Edberg | Jan. 30, 1945 |
| 2,408,480 | Reid | Oct. 1 1946 |
| 2,465,873 | Hibbs | Mar. 29, 1949 |
| 2,465,904 | McNeely | Mar. 29, 1949 |
| 2,563,574 | Berry | Aug. 7, 1951 |

FOREIGN PATENTS

| | | |
|---|---|---|
| 127,366 | Switzerland | Sept. 1, 1928 |
| 494,809 | Germany | Mar. 27, 1930 |
| 629,810 | Germany | May 13, 1936 |
| 977,609 | France | Apr. 3, 1951 |